Figure 5:
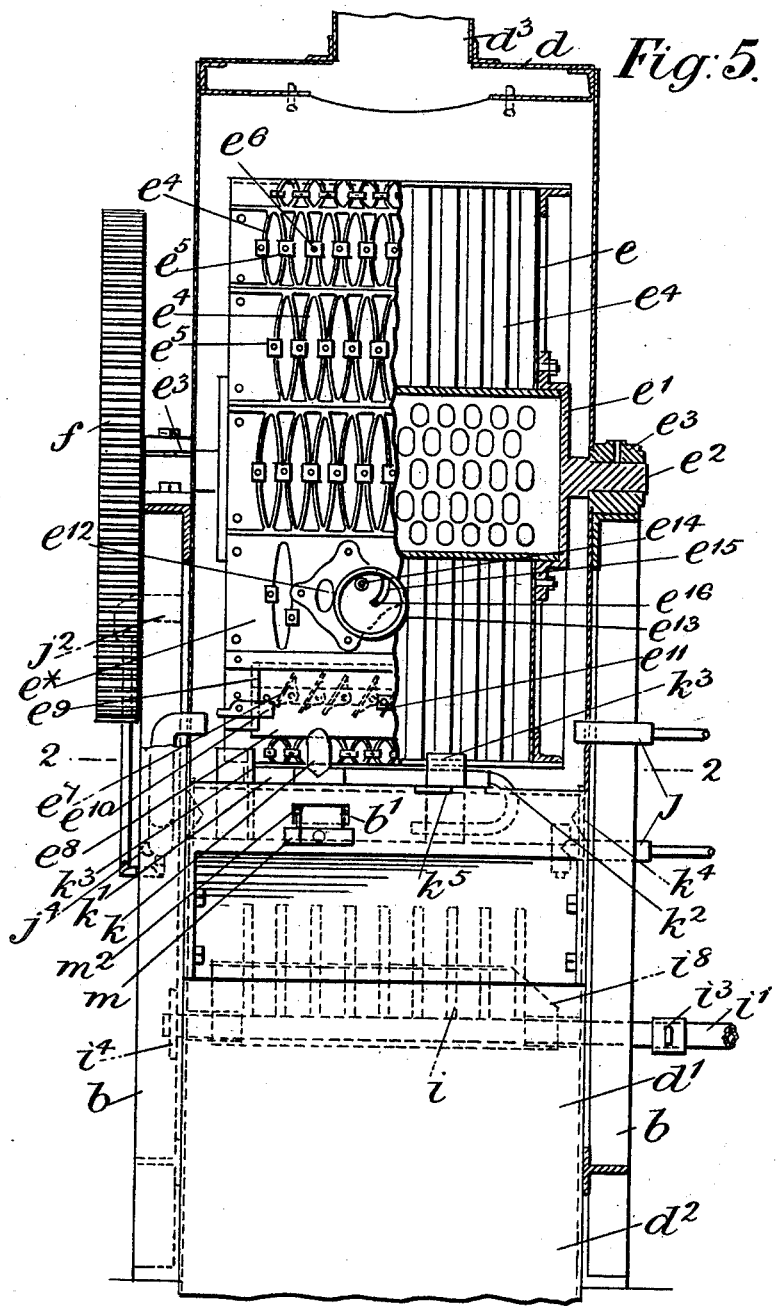

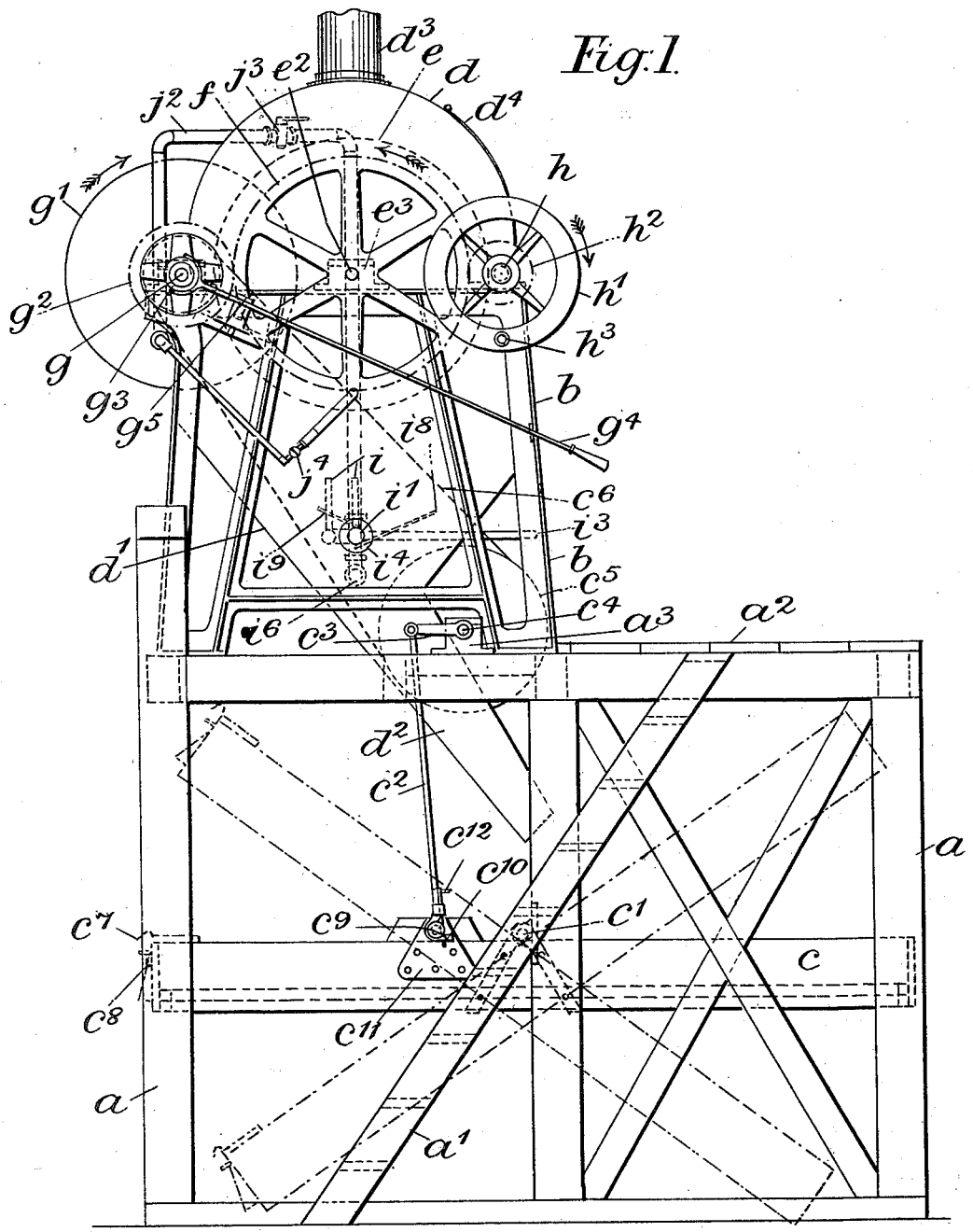

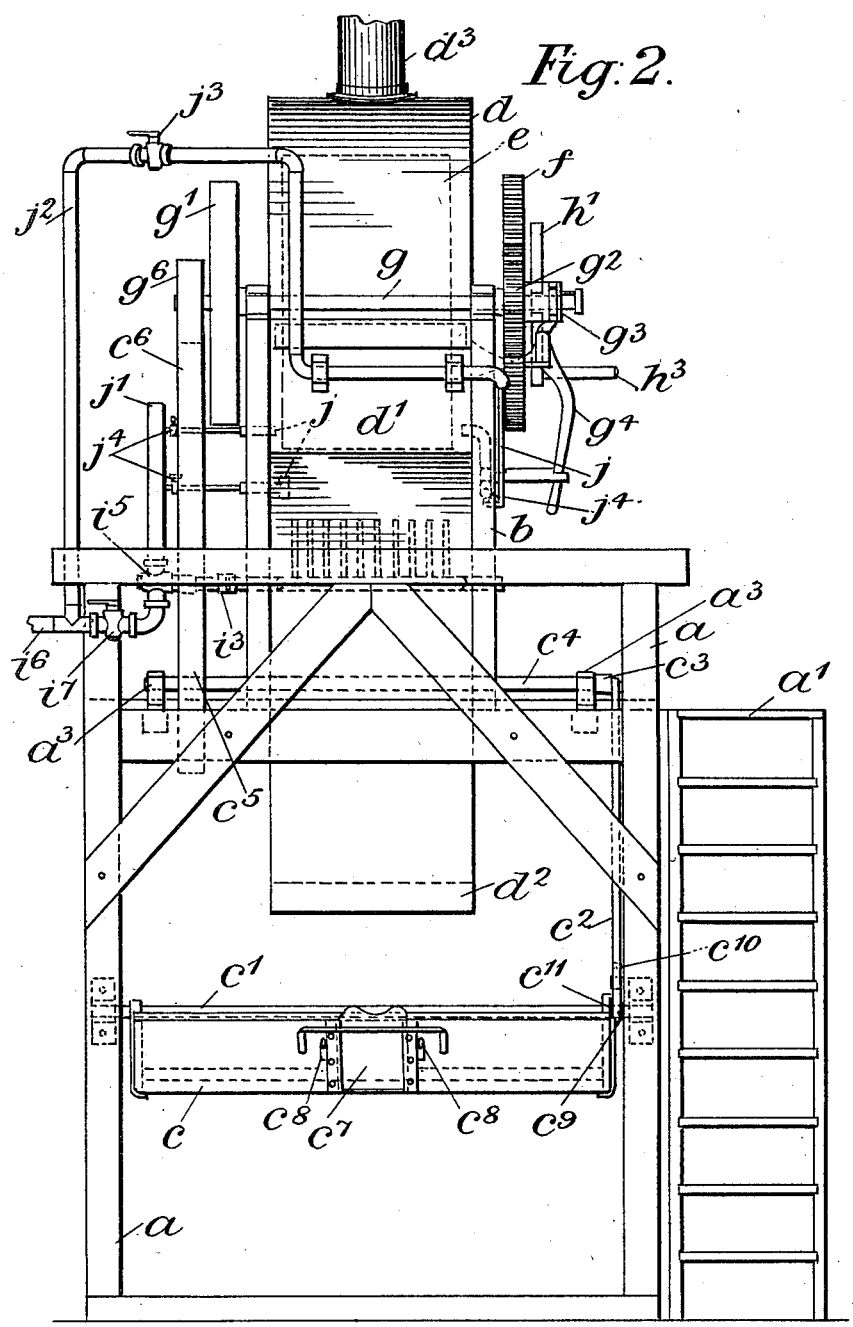

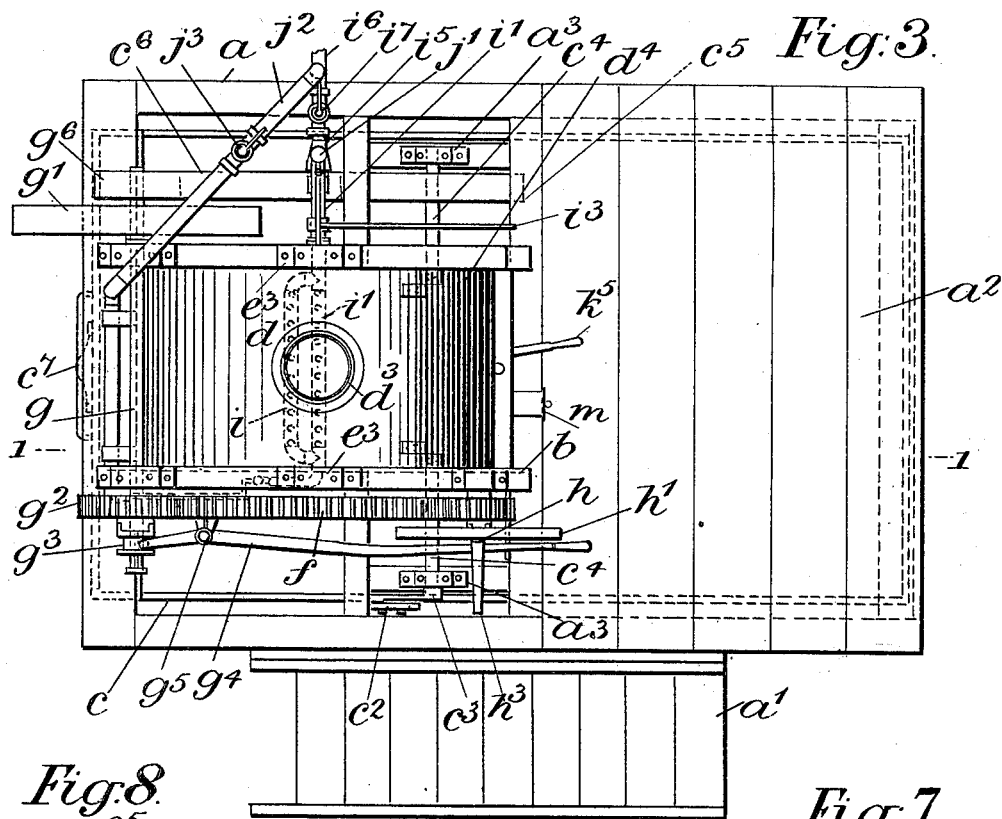
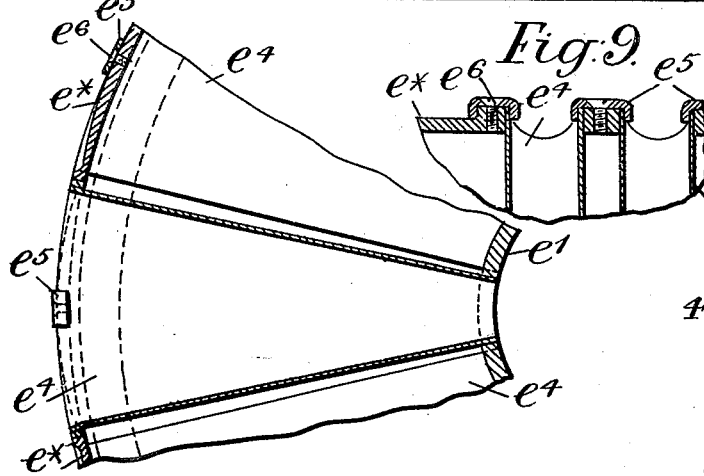
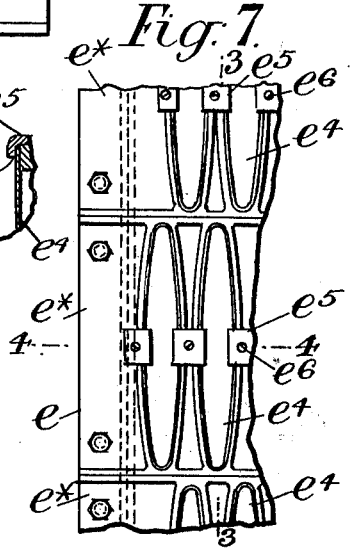

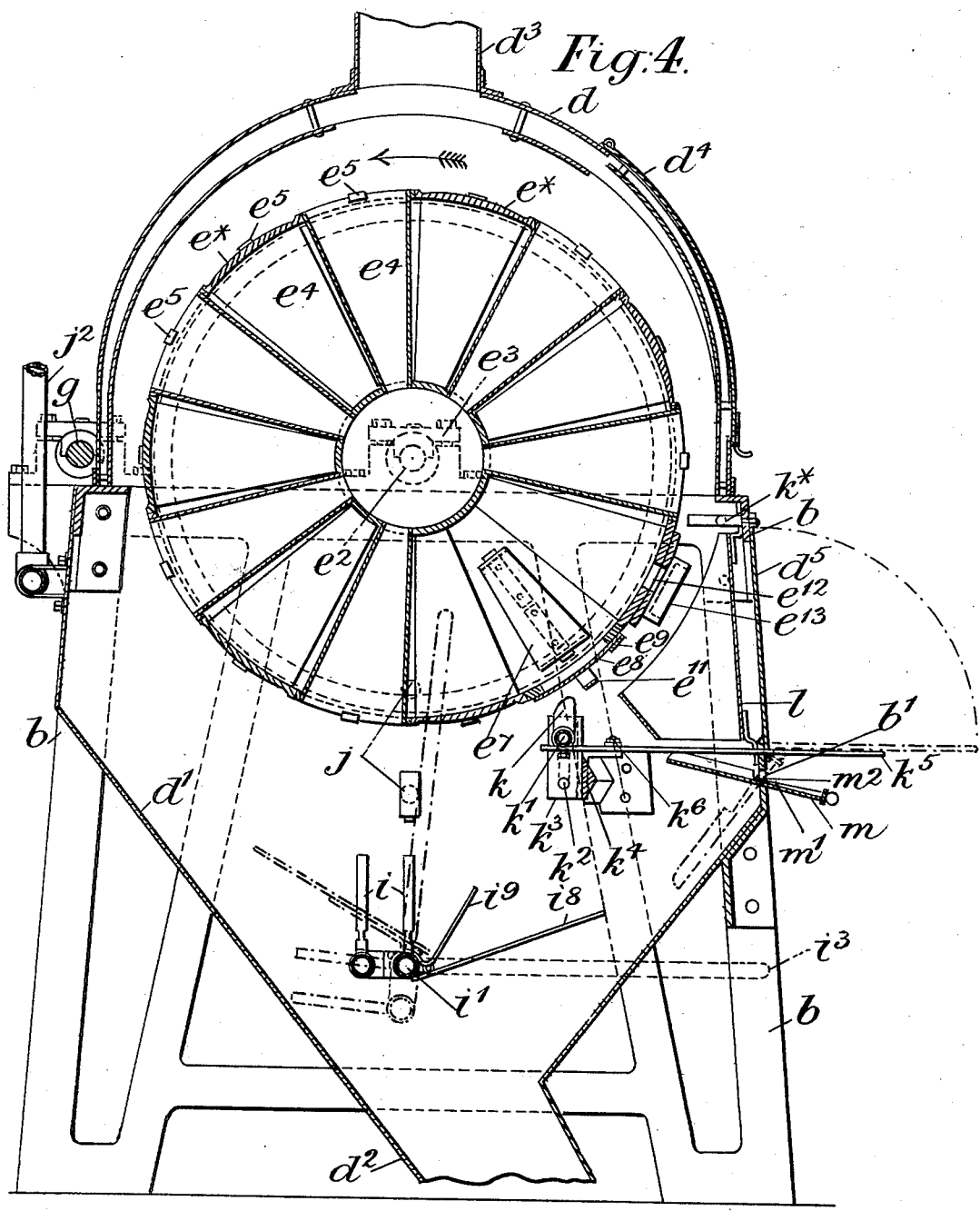

No. 697,129. Patented Apr. 8, 1902.
E. BOYES.
MEANS FOR ROASTING COFFEE.
(Application filed Dec. 15, 1900.)
(No Model.) 7 Sheets—Sheet 5.

Witnesses:
Katharine E. Manning.
Harry A. Knight

Inventor:
Ebenezer Boyes,
By Knight Bros.
Attorney

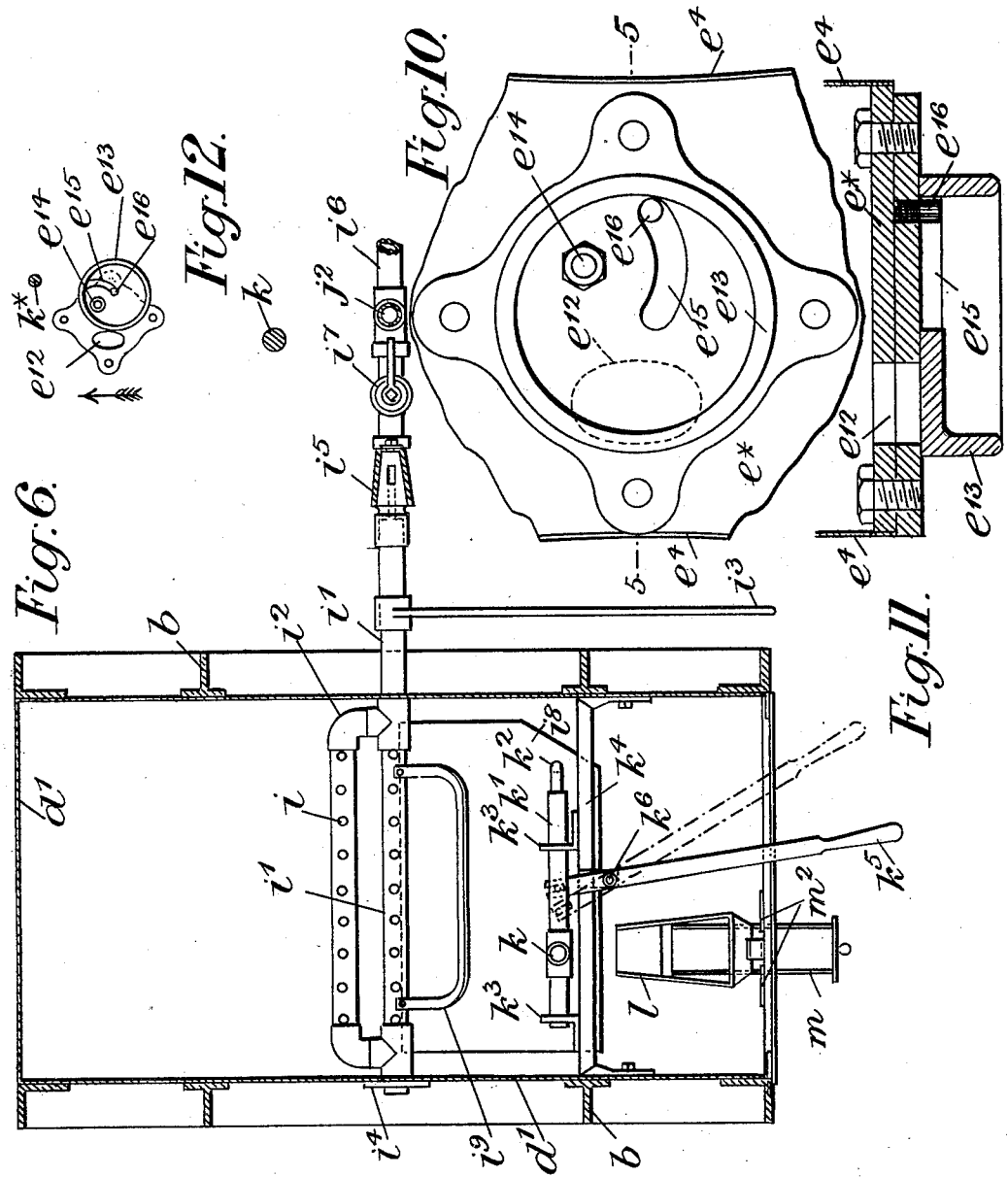

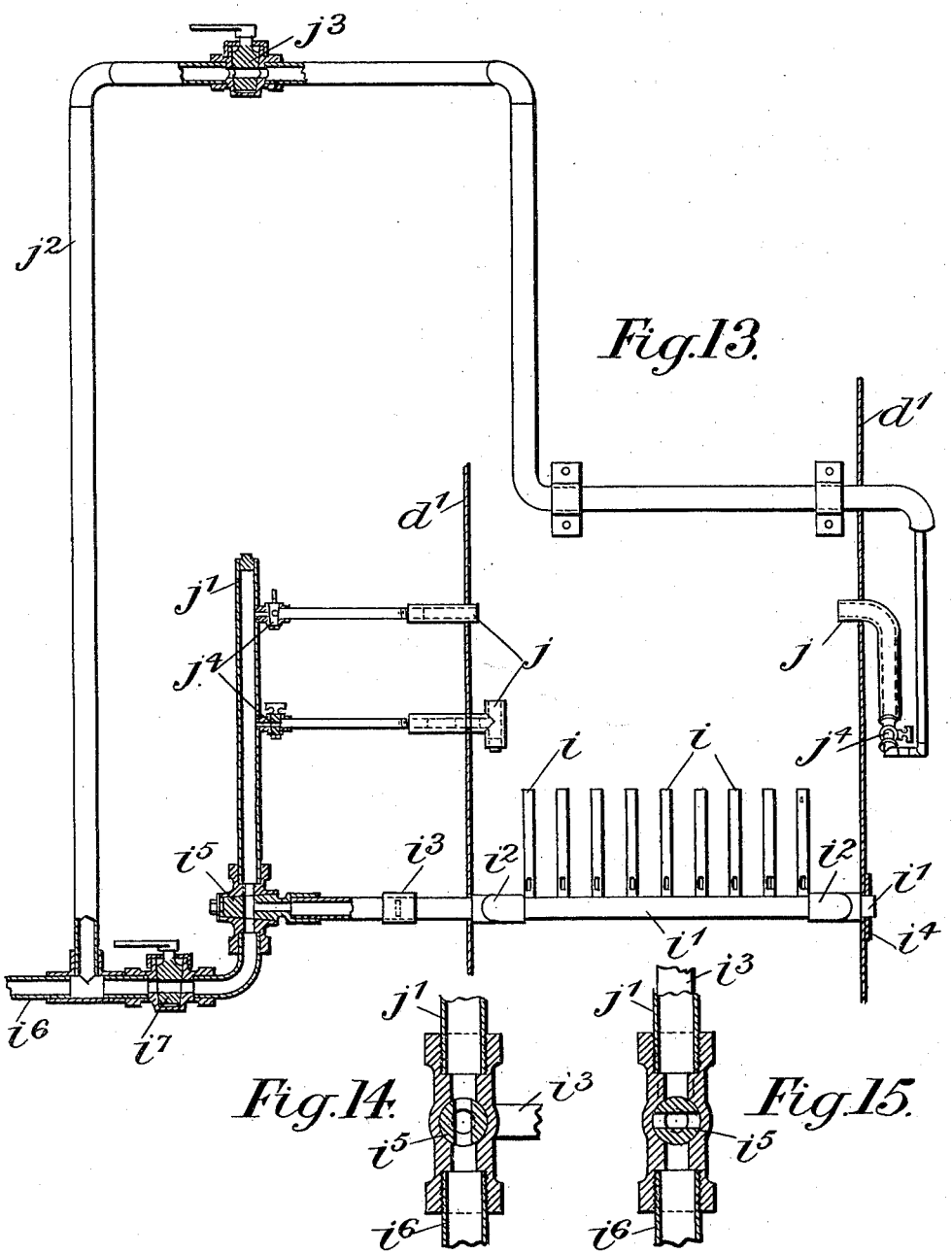

UNITED STATES PATENT OFFICE.

EBENEZER BOYES, OF PECKHAM, ENGLAND.

MEANS FOR ROASTING COFFEE.

SPECIFICATION forming part of Letters Patent No. 697,129, dated April 8, 1902.

Application filed December 15, 1900. Serial No. 39,998. (No model.)

*To all whom it may concern:*

Be it known that I, EBENEZER BOYES, wholesale coffee-dealer, a subject of the Queen of Great Britain, residing at Albert road, Peckham, in the county of Surrey, England, have invented certain new and useful Improvements in Means for Roasting, Torrefying, or Drying Coffee, Cocoa, or other Grain or Seed or other Material, of which the following is a specification, reference being had to the drawings hereunto annexed and to the letters marked thereon.

The invention relates to improvements in means for roasting, torrefying, or drying coffee, cocoa, or other grain or seed or other material.

In the roasting of coffee, to which the invention is more especially applicable, a sharp heat is required combined with the stirring about of the berries in such manner that during the operation they are severally exposed for a suitable time to the influence thereof; and the primary object of the present invention is to accomplish this in a more thorough manner and to obtain a better product than heretofore.

In the accompanying drawings, Figure 1 is a side elevation of a machine constructed according to the present invention. Fig. 2 is a rear elevation thereof. Fig. 3 is a plan or top view thereof. Fig. 4 is a vertical section thereof, taken on the line 1 1 of Fig. 3, but with the cooler and platform removed. Fig. 5 is a front elevation of Fig. 4, partly in section. Fig. 6 is a horizontal section taken on the line 2 2 of Fig. 5. Fig. 7 is a plan of a portion of the drum. Fig. 8 is a section taken on the line 3 3 of Fig. 7. Fig. 9 is a transverse section taken on the line 4 4 of Fig. 7. Fig. 10 is a plan or face view of the sampling door or shutter and connected parts, showing the same in its closed position. Fig. 11 is a transverse section thereof, taken on the line 5 5 of Fig. 10. Fig. 12 is a diagrammatic view showing the sampling door or shutter in its open position and the relative positions of the studs or projections for opening and closing the same. Fig. 13 is an enlarged view of part of Fig. 2, some of the parts being shown in section. Fig. 14 is a sectional view of the burner gas-cock, showing the same in its "on position;" and Fig. 15 is a similar view, but showing the cock in its "off position."

In the several figures, in which like parts are indicated by similar letters of reference, Figs. 4, 5, 6, and 12 and 13 are drawn to an increased scale, Figs. 7, 8, 10, 11, 14, and 15 are drawn to a further increased scale, and Fig. 9 is drawn to a still further increased scale with respect to Figs. 1, 2, and 3.

$a$ represents a frame or staging, within which is mounted a rocking cooler $c$, hereinafter more fully referred to, and said staging is provided with a platform $a^2$ for the operator, approached by a ladder $a'$.

$b$ represents the frame of the roasting-machine, which is mounted upon the top of the staging $a$, and $d$ represents a casing which incloses the roasting-drum and at its lower part forms a hopper $d'$, terminating in a spout or chute $d^2$, and at its upper part is provided with a chimney $d^3$ to carry off the products of combustion from the furnace and a hinged door $d^4$ to give access to the interior thereof.

Within the casing $d$ is arranged a closed drum or cylinder $e$, through which axially thereof and fixed therewith passes a hollow cylinder $e'$ of smaller diameter, which is closed at its ends and exteriorly of the drum is provided with axes $e^2$, mounted with capability of revolving in bearings $e^3$, arranged exteriorly of the casing $d$ and carried by the frame $b$.

Fixed upon one of the axes $e^2$ is a toothed wheel $f$, and loosely mounted upon a countershaft $g$, which is driven through a band-wheel $g'$ from any suitable engine, is a pinion $g^2$, which gears with the toothed wheel $f$ and is, by means of a clutch $g^3$, actuated by a lever $g^4$, mounted upon an axis of motion $g^5$ and extending to the front of the machine, adapted to be clutched with the shaft $g$ at the times desired, and thus caused to give motion to the drum $e$. Also gearing with the toothed wheel $f$ is a second pinion $h^2$, which is loosely mounted upon a short shaft or stud $h$, fixed with the frame $b$, and the pinion $h^2$ has fixed therewith a fly-wheel or hand-wheel $h'$, provided with a crank-handle $h^3$, by the aid of which the pinion $h^2$, toothed wheel $f$, and drum $e$ may be rotated when the pinion $g^2$ is unclutched for the purpose hereinafter described.

Interiorly of the drum $e$ and radiating from the axial cylinder $e'$ are arranged a number of tapered tubes $e^4$ of a flattened oval or elliptical section, and these tubes $e^4$ at their smaller ends are fixed with and open into the axial cylinder $e'$ and at their other or larger ends pass through and are fixed with the periphery of the drum $e$. The periphery of the drum $e$ is composed of a number of segmental plates $e^*$, bolted to the framing of the drum and perforated to receive the large ends of the tubes $e^4$, which are fixed in position by means of clips or straps $e^5$, embracing the edges of adjacent tubes and the intervening ends of the segmental plates and secured thereto by screws $e^6$. The tapered flattened tubes $e^4$ are arranged in rows in such manner that the tubes of one row are disposed intermediate of those of the next row, so that in the revolution of the drum $e$ the coffee-berries contained therein will be continuously shifted about and turned over and thoroughly exposed to the heat of the fire. In the absence of any controlling means the flattened tubes $e^4$, by reason of their peculiar arrangement, have a tendency to carry the coffee-berries to one side or end of the drum $e$, and in order to counteract that tendency a number of angularly-disposed tapered deflecting-plates $e^7$ are arranged in a suitable position within the drum $e$ and across the same, a row of tubes $e^4$ being omitted to furnish the necessary space therefor.

The fire, which is arranged within the hopper part $d'$ of the casing beneath the drum $e$, preferably consists of a number of Bunsen gas-burners $i$, arranged beneath the drum and carried by a main pipe $i'$ and loop $i^2$ therefrom, and the pipe $i'$, which is provided with a lever-handle $i^3$, is mounted with capability of turning in bearings $i^4$ $i^5$ and is supplied with gas from a service-pipe $i^6$. That end of the pipe $i'$ carried by the bearing $i^5$ is formed conical and constitutes the plug of a cock or valve, and the bearing $i^5$, to which the service-pipe $i^6$ is coupled, forms the seat or barrel thereof, and this cock is so arranged that the raising of the lever-handle $i^3$ into the position indicated by the dotted lines in Fig. 4 shuts off the supply of gas and the depressing of said lever into the position also indicated by the dotted lines in said figure opens said supply to the burners $i$, while the supply to the valve $i^5$ is controlled by a main cock $i^7$.

In addition to the burners $i$, located beneath the drum $e$, other or supplemental burners $j$ are provided at the sides or ends thereof, which may be used as occasion requires, and those burners $j$ at one side of the drum $e$ are supplied by a stand-pipe $j'$, rising from the cock $i^5$ and controlled thereby, together with the burners $i$, while the other side burners $j$ are supplied by a branch $j^2$ from the service-pipe $i^6$, controlled by a main cock $j^3$, and all of said side burners $j$ are individually controlled by taps or cocks $j^4$, while an opening fitted with a door $d^5$ is provided to give access to the burners for lighting or other purposes.

In order to protect the burners $i$ from the roasted coffee-berries discharged from the drum $e$ into the hopper $d'$ and to direct the same into the spout $d^2$, a deflecting-plate $i^8$ is provided, which is hinged to the pipe $i'$, and as the burners $i$ are by the lever $i^3$ in the shutting off of the gas turned into the position indicated by the dotted lines in Fig. 4 previous to the discharge of the coffee, the deflecting-plate $i^8$ tumbles over into the position shown by the dotted lines in said figure, in which position it is supported by a stop-plate $i^9$, fixed to the pipe $i'$.

The drum $e$ is provided with a door $e^8$, closing an opening in the periphery thereof, through which the drum is fed and discharged, and this door is secured in position by means of guides $e^9$, under which it slides, and turn-buttons $e^{10}$, which engage its side edges, while it is provided with a handle $e^{11}$, adapted to be gripped by a tool, such as a pair of tongs, for manipulating the same.

In order to sample the coffee from time to time, an opening $e^{12}$ is provided in the periphery of the drum $e$, and said opening is normally covered by a door or shutter $e^{13}$, eccentrically mounted upon an axis of motion $e^{14}$ and provided with a segmental slot $e^{15}$, into which takes a fixed stud $e^{16}$, which serves to limit the movements of the door $e^{13}$. The sampling-door $e^{13}$ is opened at the required times by means of a stud or projection $k$, which in the revolution of the drum $e$ engages the rim of the door or shutter $e^{13}$ at one side of the axis $e^{14}$ and turns it upon said axis into the position indicated at Fig. 12, when a small quantity of coffee is discharged through the uncovered opening $e^{12}$, and the door or shutter $e^{13}$ is immediately afterward closed by means of a fixed stud $k^*$, carried by the framing and which in the continued revolution of the drum $e$ engages the rim of the door $e^{13}$ on the opposite side of its axis $e^{14}$ and closes the same. The relative acting positions of the door or shutter $e^{13}$ and studs $k$ $k^*$ will be understood upon reference to the diagram, Fig. 12.

It is only required to occasionally take a sample of coffee during the roasting operation, and in order to enable this to be accomplished the stud $k$ is adapted to be thrown into or out of the path of the door or shutter $e^{13}$ at the will of the operator. For this purpose the stud $k$ is fixed with a bar $k'$, which may conveniently consist, as shown, of a length of gas-barrel mounted with capability of longitudinal movement in guide-brackets $k^3$, carried by a bar $k^4$, extending across the machine, and at its ends fixed with the frame $b$, and the bar $k'$ is held against rotation by means of the returned end $k^2$ thereof, which passes through a separate opening in one of said guide-brackets $k^3$, and the required longitudinal movements are given to the bar $k'$ to throw the stud $k$ into or out of action by means of a lever $k^5$, mounted on a vertical axis $k^6$, carried by a bracket from the fixed bar $k^4$, and adapted to be fixed in the required positions by notches formed in the framing $b$.

The sample of coffee thrown out at the opening $e^{12}$ is received into a fixed hopper $l$, which guides it into a sampling tray or drawer $m$, mounted in a slot $b'$ in the frame $b$ with capability of oscillating or rocking and sliding within certain limits governed by the slot $b'$ and the notches $m'$ and studs $m^2$, hereinafter referred to, so that the tray or drawer $m$ is adapted to be turned into the inclined position (indicated by the full lines in Fig. 4) in order to receive the sample, which will then slide by gravity to the front of the tray, where access can be had to it, or into the hanging position, (indicated by the dotted lines,) when the unused part of the sample will be discharged into the hopper $d'$.

In order that the tray $m$ may be manipulated in the required manner and, if desired, rest by gravity in either of its positions, studs $m^2$ are fixed to the frame $b$ at the sides of the slot $b'$ and engage long notches or slots $m'$ in the sides of the tray, and these parts admit of the tray receiving an endway movement by which either end of the tray may be caused to overbalance the other.

The rocking cooler $c$ consists of a rectangular sieve mounted upon an axis of motion $c'$ and by a link or connecting rod $c^2$, coupled with a crank $c^3$, fixed on the end of a shaft $c^4$, mounted with capability of revolution in bearings $a^3$ and receiving motion through a band wheel or pulley $c^5$, fixed thereon and an endless band or belt $c^6$ from a band wheel or pulley $g^6$, fixed on the counter-shaft $g$, by which means a rocking motion is imparted to the cooler $c$ at the times desired. The cooler $c$ at one end thereof is provided with an opening closed by a sliding door $c^7$, by removing which the finished coffee may be discharged into a bag (not shown) which may be suspended from hooks $c^8$.

In order that the rocking cooler $c$ may be put into and out of action at the times desired—that is to say, put in motion when the coffee is about to be discharged from the drum $e$ and until the same has cooled and allowed to remain stationary when that is accomplished—the link $c^2$ is at its lower end formed with a hook $c^9$, which engages a laterally-projecting stud $c^{10}$ upon a fitting $c^{11}$, carried by the side of the cooler $c$, and is locked therewith by a bolt $c^{12}$, so that it may be disconnected therefrom at will.

The operation of the machine may be described as follows: The upper door $d^4$ of the casing $d$ is opened. The drum $e$ is by means of the crank-handle $h^3$ of the fly-wheel $h'$ turned until the door $e^8$ of the drum is in its upper position beneath the opening uncovered by the opening of the door $d^4$. The door $e^8$ of the drum is opened and the charge of coffee to be roasted is filled into the drum. The door $e^8$ is then closed, the lower door $d^5$ of the casing is opened, the gas fire is started, and the loose pinion $g^2$ is by means of the lever $g^4$ clutched with the power-driven or counter shaft $g$, and the drum $e$ is thereby slowly rotated and the heat and products of combustion from the fire enter the large ends of the flattened tubes $e^4$ and thence pass into the axial cylinder $e'$ and are more or less distributed among the tubes $e^4$, which are for the time being above the axis of the drum $e$ and escape into the upper part of the casing $d$, whence they are conducted away by the chimney $d^3$. In the rotation of the drum the coffee-berries are turned over and over and shifted about by the tubes $e^4$ and deflecting-plates $e^7$, so that the entire surface of each individual berry is continually and thoroughly exposed to the heat of the fire. The coffee is sampled from time to time in the manner hereinbefore described by shifting the lever $k^5$, and when it is found that in the judgment of the operator the roasting is nearly completed the lever $i^3$ is raised, thereby shutting off the supply to the gas-burners, controlled by the cock $i^5$, and turning the burners $i$ out of the way, the side burners supplied by the branch $j'$ are shut off, the loose pinion $g^2$ is unclutched from the counter or driven shaft $g$, the door $e^8$ is opened, the drum $e$ is turned by the crank-handle $h^3$ until the doorway is underneath and the coffee, which by this time is completely roasted, is discharged into the hopper $d'$ and by the spout $d^2$ delivered into the cooler $c$, which has been previously coupled with the link $c^2$ and set in motion, the several operations, from the shutting off of the gas to the discharge of the roasted coffee into the cooler, occupying but a few seconds. The rocking motion of the cooler $c$ causes the hot coffee-berries to roll to and fro over the sieve-bottom thereof, by which means the temperature of the coffee is instantaneously lowered and any danger of further cooking is avoided. When the coffee is sufficiently cooled, the link $c^2$ is uncoupled from the cooler $c$, a bag is attached to the hooks $c^8$, the door $c^7$ is opened, the cooler is tilted, and the coffee discharged therefrom into the bag.

By the means hereinbefore described the roasting of coffee is accomplished in a more thorough and efficient manner than heretofore and a much improved product is obtained.

It will be obvious that the apparatus may be usefully employed for roasting or drying other grain or seed or other material.

Having now particularly described and ascertained the nature of the said invention and in what manner the same is to be performed, I declare that what I claim is—

1. In a roasting drying or torrefying apparatus a closed drum mounted with capability of revolution means for heating the same, a closed cylinder arranged axially within the drum, a number of radially-disposed open-ended and flattened tapered tubes extending from the periphery of the drum to the axial cylinder for conducting the heat and products of combustion through the interior thereof, means for rotating the drum and a door for charging and discharging the same substantially as herein shown and described.

2. In a roasting drying or torrefying apparatus a closed drum mounted with capability of revolution, means for heating the same, a closed cylinder arranged axially within the drum, a number of radially-disposed open-ended flattened tapered tubes extending from the periphery of the drum to the axial cylinder for conducting the heat and products of combustion through the interior thereof said tubes being arranged in rows with the tubes of one row intermediate of those of the next row, means for rotating the drum and a door for charging and discharging the same substantially as herein shown and described.

3. In a roasting drying or torrefying apparatus a closed drum mounted with capability of revolution, means for heating the same, a closed cylinder arranged axially within the drum a number of radially-disposed open-ended flattened tapered tubes extending from the periphery of the drum to the axial cylinder for conducting the heat and products of combustion through the interior thereof said tubes being arranged in rows with the tubes of one row intermediate of those of the next row, a row of angularly-disposed deflecting-plates arranged in the place of one row of tubes, means for rotating the drum and a door for charging and discharging the same substantially as herein shown and described.

4. In a roasting drying or torrefying apparatus a closed drum mounted with capability of revolution, means for rotating the drum, a door for charging and discharging the same, a fire consisting of a number of Bunsen burners arranged beneath the drum and carried by a pipe mounted with capability of turning in bearings and at one end closed and at the other end formed as one part of a cock the other part being fixed to the supply-pipe the cock being so constructed that the rotation of the burners in one or the other direction opens or closes the gas-supply, means for turning the burners and a hinged deflecting-plate carried by the burner-pipe for tumbling over the burners in their turned-out position and directing the coffee discharged from the door of the drum into the required channel substantially as herein shown and described.

5. In a roasting drying or torrefying apparatus a closed drum mounted with capability of revolution, means for rotating the drum, a door for charging and discharging the same means for heating the drum, a sampling-door on the periphery of the drum consisting of an eccentrically-mounted disk, a projection adapted to be brought into the path of the disk on one side of the axis of the disk to open it and a fixed projection adapted to engage the disk on the opposite side of said axis to close it and means for receiving the discharged sample substantially as herein shown and described.

6. In a roasting, drying or torrefying apparatus, the combination of a rotating drum, a burner-pipe rotatably mounted beneath the drum, burners upon the burner-pipe, means rotating the burner-pipe to throw the burners away from the drum, and means operated to cover the burner when the burner-pipe is rotated.

EBENEZER BOYES.

Witnesses:
C. MELBOURNE WHITE,
C. H. WHITE.